United States Patent Office 2,696,774
Patented Dec. 14, 1954

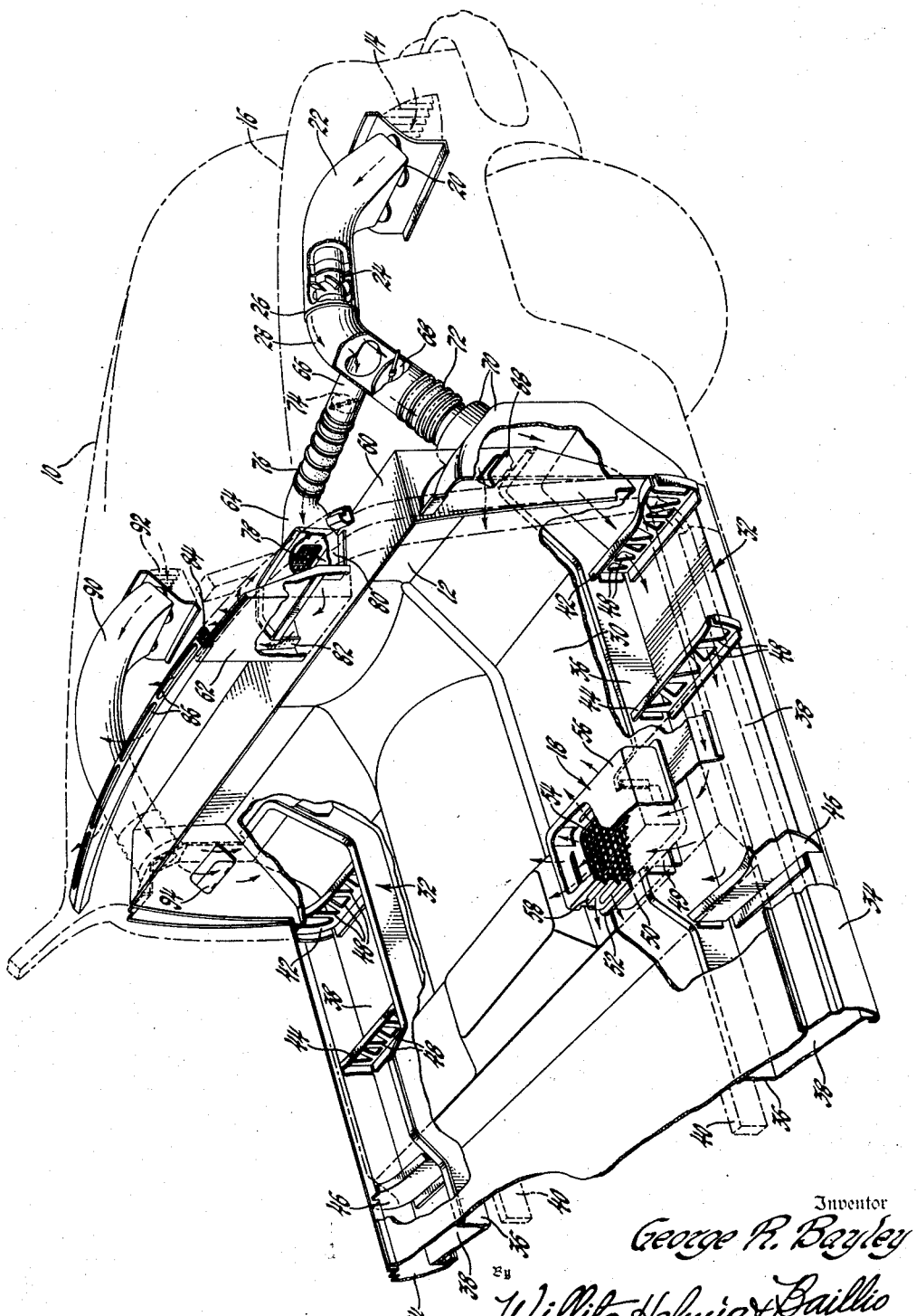

2,696,774

AUTOMOBILE HEATING AND VENTILATING SYSTEM

George R. Bayley, Flint, Mich., assignor to General Motors Corporation, Detroit, Mich., a corporation of Delaware Application January 12, 1950, Serial No. 138,241

8 Claims. (Cl. 98—2)

This invention relates to a system for heating and ventilating automobiles and particularly to an improved means for conducting incoming air to a heat exchanger, wherein structural members of the automobile body are utilized as air ducts.

The principal object of the invention is the provision of such a construction whereby air taken from outside the vehicle through a duct having its inlet located at the front end of the vehicle may be conveyed beneath the floor and between body members performing their ordinary structural functions and discharged into the body compartment to a heater or air conditioning member, which is preferably located under one of the vehicle seats. This design eliminates the necessity of separate tubing to conduct the air within the body structure. Furthermore, it has the added advantages of being of sturdy construction and at the same time inexpensive and simple to manufacture.

For a better understanding of the nature and objects of the invention, reference is made to the specification wherein there is described a preferred embodiment of the invention illustrated in the accompanying drawing, which is a perspective view, partly in section and partly in elevation, of the automobile heating and ventilating system.

Referring to the drawing, there is shown with broken lines the body of a motor vehicle having a hood 10 and a dash panel 12 which separates the passenger and engine compartments. A grille 14 is located either in the front face of the right hand fender 16 or between the fenders in the forward wall of the engine compartment, the grille shown having vertically extending slots formed through it. The vehicle described is one propelled by an internal combustion engine having a cooling system for the circulation of a cooling medium, such as water, having a temperature during engine operation of a sufficiently high degree so that the air can be heated therefrom.

Positioned under the front seat is a heating unit 18, which may be of a known construction having air passages located between tubes or channels adapted to have hot water from the engine cooling system circulated through them. Although this member 18 will be hereinafter referred to as a heating unit, it will be understood that it is not the intention to thereby limit the scope of the invention and that the invention is generally adapted for use with all types of air conditioning means, such as heaters, air conditioners and the like.

Under the hood or fender and rearward of the grille is an air inlet 20 to a duct 22 of relatively large cross section, which duct is inclined upwardly and extends rearwardly under the hood or fender. This air duct 22 may be used for conducting either forced air or air admitted through impact due to the forward motion of the vehicle. Rearward of the air inlet and positioned within the duct 22 is a blower 24 adapted to be driven by an electric motor, the duct 22 also functioning as a housing for the blower unit. When in operation this blower 24 draws air through the grille 14 and forces it rearwardly through duct 22.

Connected to the outlet 26 of the duct 22, and in effect an extension of it, is a tube 28 of approximately the same diameter as the outlet end of the duct 22, which tube extends rearwardly under the hood or fender and downwardly to direct the incoming air under the floor 30 of the vehicle. This air, passing underneath the automobile floor, travels rearwardly through the duct defined by the floor 30, the rocker panel 34 and the longitudinally extending structural member 32 positioned beneath the floor.

In the embodiment of the invention shown in the drawing, 32 is a single L-shaped member which is used to form two walls of the box-type sill construction functioning as the air duct, the shorter leg 36 and the longer leg 38 constituting the inner side wall and the bottom wall, respectively. It will be understood, of course, that legs 36 and 38 could be separate members if it were found desirable to so construct this box-type sill. The longitudinal member 32 may be secured to the frame members, such as those indicated by 40, in a conventional manner.

The floor 30, which forms the top wall of the air duct, has its outer edge secured to the upper edge of the rocker panel 34 and is supported by the leg 36, the apertured transverse structural members 42 and 44 and the imperforate transverse structural member or partition 46. The rocker panel, functioning as the outer side wall of the duct, has its lower edge fastened to the outer edge of the leg 38. The transverse members 42, 44 and 46 are seated upon the horizontal leg 38 with their inner and outer ends positioned against and secured to the vertical leg 36 and the rocker panel 34, respectively.

The air flows rearwardly through the duct defined by the members 30, 32 and 34 by passing through the triangularly shaped apertures 48 in the transverse structural members 42 and 44, but further rearward travel is prevented by the imperforate partition 46 located rearwardly of the point at which the heating unit 18 communicates with the incoming air duct. This partition directs the air through an opening 49 shown in the inner side wall of the duct and into the heating unit. It will be understood, of course, that air can be admitted to the heating unit in a manner other than that shown, it being preferable to so locate the imperforate partition in relation to the air inlet of the unit that the air admitted will not be laden with foreign matter circulated by vehicle travel.

The heating unit 18 consists principally of a heater core 54 mounted within a casing 50. This casing is shown as extending downwardly through an opening in the vehicle floor 30 and is supported in the opening by the longitudinal member 36 and the outwardly extending casing flange 52 which rests on and is secured to the floor. After entering the opening in the casing, which registers with opening 49, the air flows through air passages in the core 54 of the heating unit 18, becomes heated thereby, and is forced upwardly against the solid top of the heat distribution outlet cover 56. The heated air is discharged through the air outlet 58 in the cover and flows forwardly, inwardly and rearwardly into the passenger compartment.

Mounted upon the horizontal panel 60 of the dash assembly and under the cowl immediately forward of the instrument panel is a casing 62 secured to and located directly rearward of a shroud 64. This shroud encloses a heat radiating device which may be of a well-known construction containing air passages located between tubes or channels adapted to have hot water from the engine cooling system circulated through them, thereby permitting heating of the air for defrosting purposes.

A branch tube 66, of a lesser diameter than the main air inlet tube 28, runs transversely under the hood and connects the defroster element to the main tube. In the main tube 28 rearwardly of the branch tube 66 there is positioned a butterfly valve 68 which in its closed position directs all incoming air into the branch tube and hence into the defroster; in its open position it permits air to enter the heating unit 18 or to be used in its unheated state for summer ventilation. Connecting the main tube 28 to the shroud 70 is a flexible hose 72, which functions as a noise deadener and provides for alignment of the tube with the opening in the shroud 70.

Disposed within the smaller tube 66 near the opening to the larger tube 28 is a butterfly valve 74 which controls the air flow to the defroster. A flexible hose 76 connects the outlet of small tube 66 with the inlet to the defroster shroud 64, providing alignment between these members and, similar to flexible hose 72, serves to deaden noises. The air flows through hose 76, through the defroster core which is positioned within the shroud 64, becoming heated thereby, and passes rearwardly through the core outlet 78. This treated air then flows rearwardly through the duct formed by casing 80, upwardly through the vertical duct 82 formed by casing 62 behind the instrument panel and then through the windshield defroster distribution duct 84. The air is dispersed transversely across the base of the windshield through the defroster outlets 86 which are graduated for equal air distribution.

A small ventilator door 88 positioned beneath the dashboard and installed in the inner wall of the body opens into the air duct 28—72—70 to provide summer ventilation. When this door is opened a portion of the incoming air is deflected directly into the passenger compartment of the vehicle.

On the left side of the vehicle is provided another air duct 90 which is positioned somewhat similarly to air duct 22—28 on the right side. This duct is provided to supply only untreated air induced into the passenger compartment by the forward motion of the vehicle, no provision being made in this duct for forcing air into the vehicle by a blower or otherwise. This fresh air enters the automobile through grille 92, passes rearwardly through duct 90, and enters the passenger compartment through an adjustable ventilating door 94 in the inner wall of the vehicle body.

Although but one embodiment of the invention is herein shown and described, it will be understood that various changes in the size, shape and arrangement of the parts may be made without departing from the spirit of the invention or from the scope of the appended claims.

I claim:

1. A motor vehicle containing an air conditioning means and an air intake means and provided with a connecting air duct comprising a generally L-shaped, longitudinally extending structural member having one leg inwardly positioned and upwardly extending and its other leg extending generally horizontally outward; a plurality of transversely extending structural members having lower edges seated upon the horizontal leg of the L-shaped member and having inner ends positioned against and secured to the upwardly extending leg; a floor seated upon and secured to the upper edges of said longitudinal and transverse structural members; and a longitudinally extending rocker panel with its lower edge secured to the outer edge of the horizontal leg of said L-shaped member and its upper edge secured to the outer edge of the floor, some of said transverse members being apertured to permit the passage of air through said duct and one of said transverse members being imperforate to direct the air through an opening in one of the formed walls of the air duct to the air conditioning means.

2. In an automobile provided with an air conditioning means and an air intake means, an air duct adapted to convey outside air to the air conditioning means, said duct comprising an L-shaped longitudinal structural member forming the bottom and inner side walls of said duct and having its shorter leg inwardly positioned and upstanding and its longer leg extending horizontally outward therefrom, a longitudinal rocker panel forming the outer side wall of said duct having its lower edge secured to the outer edge of the longer arm, a floor seated upon and secured to the upper edge of said shorter leg and secured to the upper edge of said rocker panel to form the top wall of said duct and, seated upon the longer arm and positioned between the shorter leg and the rocker panel and secured thereto, a plurality of transverse structural members, said transverse members which are located between the intake to the air conditioning means and the air duct intake being apertured to permit the passage of air therethrough, the transverse member forming the end of the duct being imperforate to direct the incoming air through an opening in said duct and into the air conditioning means.

3. A motor vehicle heating and ventilating system comprising an air intake means having an inlet located in an anterior wall of said vehicle; an air conditioning means disposed within the vehicle body; a floor which forms the top wall of an underfloor duct for the rearward and inward transmission of air; generally horizontal and vertical longitudinal structural members positioned beneath the floor and forming the bottom and inner side walls of the duct, the vertical members supporting the floor; a rocker panel, forming the outer wall of the duct, having its lower edge secured to the outer edge of the bottom wall and its upper edge secured to the outer edge of the floor; positioned within the formed duct, a plurality of apertured generally transverse structural members having lower edges seated upon the bottom wall and upper edges supporting the vehicle floor, the inner and outer ends of said transverse members positioned against and secured to the inner wall and the rocker panel, respectively; and an imperforate generally transverse structural member secured in the same manner as the apertured transverse structural members and located rearwardly of the aftermost of said apertured structural members, the portion of the duct between said imperforate transverse member and said aftermost apertured transverse member provided with an opening to permit communication between said duct and the air conditioning means, the forward portion of said duct opening into and communicating with the air intake means.

4. The combination, with an air conditioning means positioned within the body of a motor vehicle and an air intake means drawing outside air rearwardly into the vehicle and discharging it beneath the floor of said vehicle, of an underfloor duct providing communication between said intake means and said air conditioning means, a portion of one wall of the duct being provided with an opening to the air conditioning means, a forward portion of the duct opening into and communicating with the intake means, said duct comprising a vehicle floor providing the top wall of the duct, longitudinally extending structural frame members positioned beneath the floor and forming the bottom and inner side walls of said duct, the inner wall having its upper edge supporting said floor, a rocker panel having its lower edge secured to the outer edge of said bottom wall and its upper edge secured to the outer edge of said floor, and a plurality of generally transversely extending structural frame members positioned within this duct, one of which is imperforate and positioned generally rearwardly of the opening to the air conditioning means to direct the air into said opening, the others of which are apertured to permit the passage of air and are positioned generally between said opening and the air intake means, the inner and outer ends of said transverse members being secured to the inner wall and the rocker panel, respectively.

5. In a vehicle frame structure, an air duct for conveying outside air to the interior of said vehicle, said duct comprising a plurality of longitudinally extending frame members secured together to form the walls of said duct and a transversely extending frame member positioned within said duct and reinforcing said longitudinally extending members, said transversely extending member being provided with an opening therein to permit the passage of air therethrough.

6. In a motor vehicle frame structure, an air duct for conveying outside air to the interior of said vehicle, said duct comprising a plurality of longitudinally extending frame members secured together to form the top, bottom and inner side walls of said duct, a rocker panel attached to said top and bottom walls and forming the outer side wall of said duct, and transversely extending frame members positioned within said duct and reinforcing said longitudinally extending frame members and said rocker panel, some of said transverse members being apertured to permit the passage of air through said duct and one of said transverse members being imperforate to direct the air through an opening in said duct to the interior of the vehicle.

7. In an automobile provided with an air conditioning means and an air intake means, a frame construction which conveys air from said intake means to said air conditioning means, said frame construction including a longitudinal frame member and a box-type sill secured to said frame member adjacent the laterally outward side thereof, said box-type sill comprising a plurality of longitudinally extending structural members secured together to form the top, bottom and inner side walls of said sill, a rocker panel attached to said top and bottom walls and forming the outer side wall of said sill, and transverse structural members positioned within said sill and reinforcing said longitudinally extending structural members and said rocker panel, some of said transverse members being apertured to permit the passage of air through said sill and one of said transverse members being imperforate to direct the air through an opening in said sill to the air conditioning means.

8. In an automobile provided with an air conditioning means and an air intake means, a chassis frame construction comprising longitudinal frame members and a box-type sill forming a duct for conveying air from said intake means to said air conditioning means, said box-type sill being secured to one of said longitudinal frame members adjacent the laterally outward side thereof, said sill comprising generally longitudinal structural members secured together to form the bottom and side walls of said sill, a plurality of generally transverse outrigger members seated upon the bottom wall and positioned between the side walls and secured thereto, and a floor seated upon the upper edges of the outrigger members and the inner side wall and secured to the outer side wall to form the top wall of the sill, some of said outrigger members being apertured to permit the passage of air through said sill and one of said outrigger members being imperforate to direct the air through an opening in said sill to the air conditioning means.

References Cited in the file of this patent

UNITED STATES PATENTS

| Number | Name | Date |
|---|---|---|
| 1,024,438 | Cooke | Apr. 23, 1912 |
| 1,146,751 | Davis | July 13, 1915 |
| 1,273,007 | Shaten | July 16, 1918 |
| 2,066,019 | Shallow | Dec. 29, 1936 |
| 2,130,131 | Hirshfeld | Sept. 13, 1938 |
| 2,151,865 | Nallinger | Mar. 28, 1939 |
| 2,178,644 | Piron | Nov. 7, 1939 |
| 2,206,119 | Persons | July 2, 1940 |
| 2,291,220 | Germonprez | July 28, 1942 |
| 2,326,318 | Anderson | Aug. 10, 1943 |
| 2,347,141 | Werdehoff | Apr. 18, 1944 |
| 2,357,043 | Ledwinka | Aug. 29, 1944 |
| 2,360,617 | Onishi et al. | Oct. 17, 1944 |
| 2,383,423 | Steins | Aug. 21, 1945 |
| 2,476,368 | Guernsey | July 19, 1949 |
| 2,553,881 | Suttles | May 22, 1951 |

FOREIGN PATENTS

| Number | Country | Date |
|---|---|---|
| 829,324 | France | Mar. 28, 1938 |